May 27, 1941.   J. M. TOWLER ET AL   2,243,585
ROTARY SELF-CLEANING STRAINER
Filed Nov. 4, 1939   2 Sheets-Sheet 1
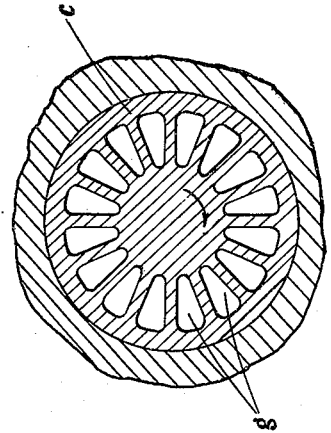
Fig. 4.
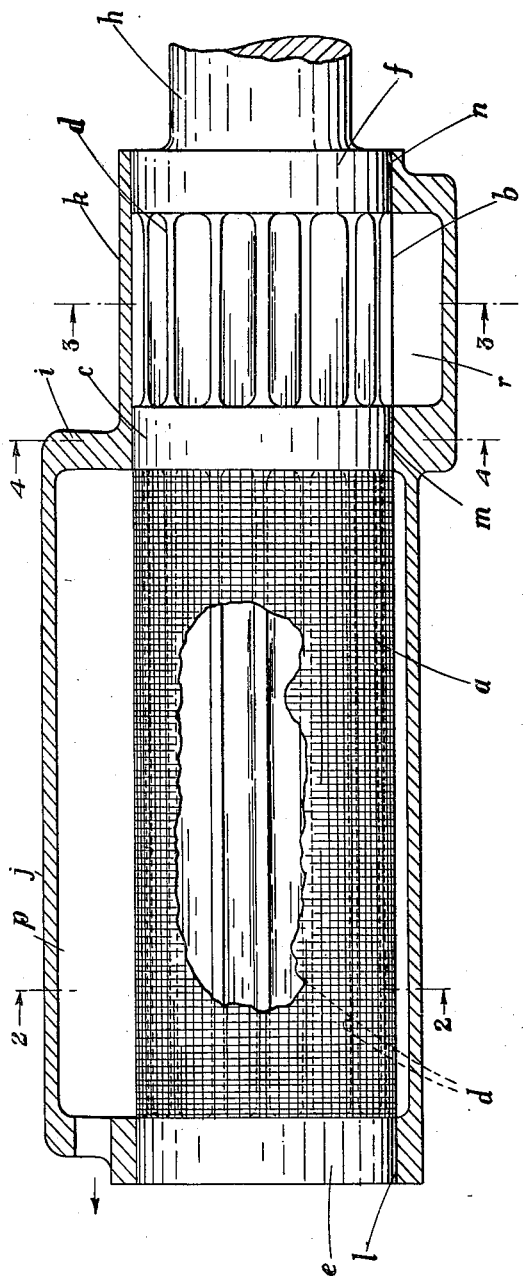
Fig. 1.
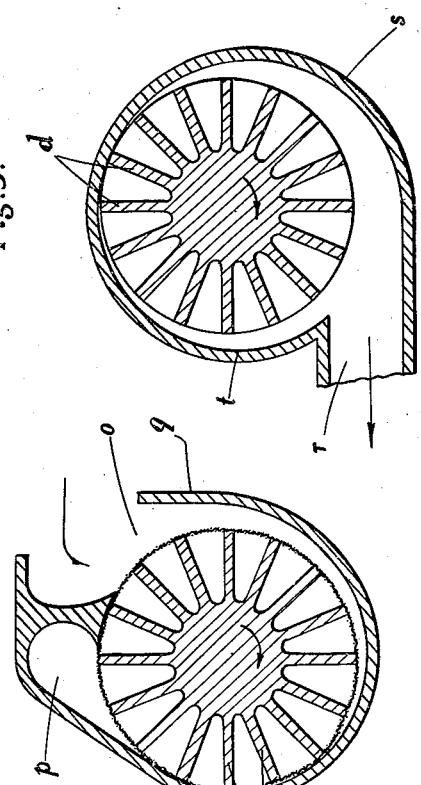
Fig. 3.
Fig. 2.
Inventor May 27, 1941.  J. M. TOWLER ET AL  2,243,585

ROTARY SELF-CLEANING STRAINER

Filed Nov. 4, 1939  2 Sheets-Sheet 2

Patented May 27, 1941

2,243,585

UNITED STATES PATENT OFFICE 2,243,585

ROTARY SELF-CLEANING STRAINER

John Maurice Towler, Summerbridge, near Harrogate, and Frank Hathorn Towler, Dob Park, near Otley, England Application November 4, 1939, Serial No. 302,812
In Great Britain October 26, 1938

5 Claims. (Cl. 103—111)

This invention relates to rotary self-cleaning strainers of the kind having a rotor which is mounted to rotate within a casing, said rotor functioning during each revolution to strain incoming liquid and to divert the same to an outlet in the casing for removal by a pump or other means and to cause excess liquid to flow in the reverse direction back through the straining element with the object of cleaning said element.

The object of the present invention is to provide an improved construction of strainer of the above type which also functions as a pump and which may either be associated with the suction side of a high speed pump or itself used as a low pressure pump.

A rotary self-cleaning strainer according to the present invention in its broadest aspect is one having a rotor which is mounted to rotate within and relatively to a casing, said rotor consisting of two intercommunicating sections, one section functioning both as a strainer and a pump and the other section solely as a pump, the arrangement being such that during each revolution of the rotor liquid in excess is induced to enter the strainer section for straining from whence it is pumped into the other or pump section which functions to pump some of said liquid through a discharge outlet in the casing and the excess liquid back through the strainer section for the purpose of cleaning its strainer element and out through a further outlet in the casing for discharge.

With a strainer according to the above embodiment the liquid to be strained and is induced in quantity in excess of that which is discharged through the main discharge outlet by the pump action of the strainer section and enters each channel in turn through the strainer element as the rotor revolves and such liquid is pumped along the channels into the adjoining channels of the other pump section some for delivery to the discharge outlet in the opposing wall of the casing, and the excess liquid is pumped back along each channel as the open channels are moved out of registration with the discharge outlet, to cause said excess liquid to pass into the communicating channels of the adjoining section, and out through the strainer element as each said channel is brought into registration with the further outlet opening in the opposing wall of the corresponding end of the casing thus ridding the strainer element of any dirt or other matter separated out from the incoming liquid.

In order that the invention may be clearly understood and carried into effect an example of the above construction of strainer will now be described by aid of the accompanying drawings in which—

Fig. 1 is a view taken longitudinally through the strainer showing the rotor in elevation and the casing in section.

Fig. 2 is a transverse section on the line 2—2 in Fig. 1.

Fig. 3 is a transverse section on the line 3—3 in Fig. 1.

Fig. 4 is a transverse section on the line 4—4 in Fig. 1.

Figure 5:
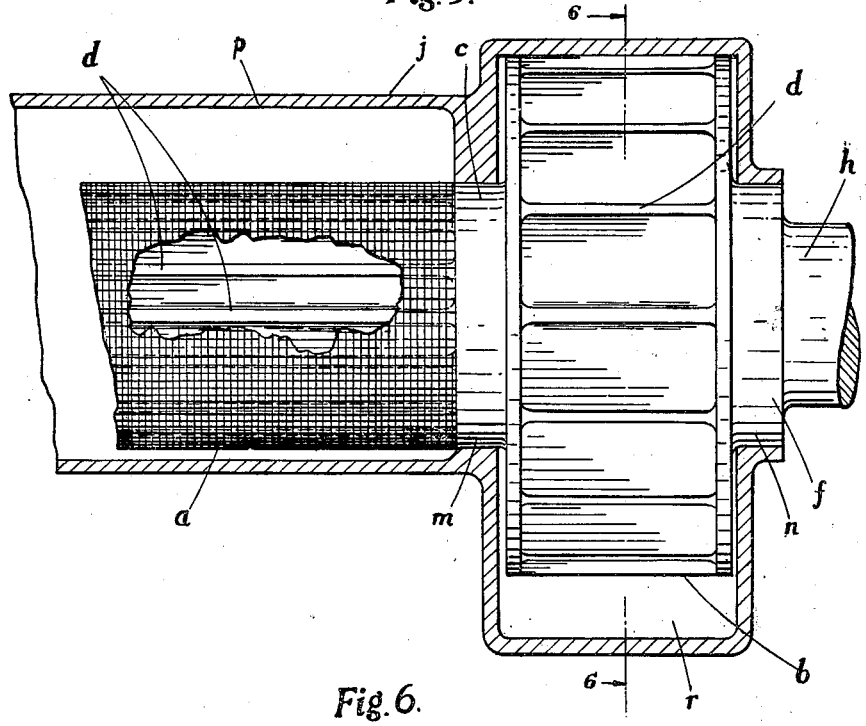
Fig. 5 is a view similar to Fig. 1 illustrating a strainer having a modified form of pump section.

In the example illustrated the rotor consists of two aligned sections of different lengths, a strainer or longest section $a$ and a pump section $b$, said sections each functioning as a pump and being separated by a cylindrical ring $c$, and each formed with a plurality of longitudinally extending radial ribs $d$ equally spaced around the sections to form, in each section, a corresponding number of aligned channels. These channels are closed at opposite ends of the rotor by cylindrical end pieces $e$ and $f$, and communicate with each other through transverse openings $g$ within the intermediate cylindrical ring $c$.

The channels of the strainer section are enclosed by a surrounding strainer element such as wire gauze or a length of wire wound round the circumference of the section to form a number of finely divided orifices, whilst the channels in the pump section are left uncovered. The rotor is driven through an axial extension $h$ which may be coupled either directly to the driving shaft of a high speed or other pump, not shown, or to another form of driving means.

The rotor, thus constructed, is mounted within a stationary casing $i$ which is divided into two sections $j$ and $k$ corresponding respectively to the strainer and pump sections of the rotor. This casing is formed with three circular bearing surfaces $l$, $m$ and $n$ for the reception of the portions $e$, $c$ and $f$ of the rotor, which portions are machined so that they are a running fit within the bearing surfaces.

The section $j$ of the casing is provided with a tangential opening $o$ constituting the inlet for liquid to be strained and a further opening communicating with a cored passage $p$ for the discharge of the liquid used to clean the strainer element as will hereafter appear, such openings being angularly separated from each other in the direction of rotation of the rotor a distance equivalent to almost a complete revolution of the rotor as shown in Fig. 2 of the drawings.

As will also be seen from Fig. 2 the section of the wall of the casing indicated at $q$ is eccentric to the rotor so as to form a section which converges gradually inwards from one edge of the inlet opening $o$ until it merges with a concentric portion of the casing facing the other side of the rotor. This eccentric portion, also the inlet opening $o$ and the opening to the outlet passage $p$ preferably extend the full length of the strainer section of the rotor.

In the wall of the section $k$ of the casing is formed a further tangential opening communicating with a discharge outlet $r$ for the strained liquid, the position of said opening in relation to the openings in the other section $j$ of the casing being shown in Fig. 3 of the drawings. The wall of this section of the casing diverges gradually from the concentric portion of the wall to the lip of the opening in a manner similar to the convergence of the section $q$ of the wall in the section $j$ of the casing, and such eccentric portion of the wall of the section $k$ of the casing is indicated at $s$.

A similar divergence in the wall of the casing is provided in that portion which merges into the outlet opening leading into the passage $p$ which divergence of all is clearly to be seen in Fig. 2 of the drawings.

The reverse flow of liquid to effect cleaning of the strainer element may conveniently be produced by constructing the interior wall of the casing where it opposes the open channels of the pump section so that over a portion of its surface said wall gradually converges inwards towards the rotor as the same revolves, thus placing the remaining or excess liquid within each open channel in turn under pressure for a part of each revolution.

A similar convergence in the wall of the casing opposing the strainer section of the rotor may also be provided to act both to induce liquid in through the strainer element and to cause the same to be pumped along the channels of the strainer section into the communicating channels of the pump section.

The discharge of liquid both through the main outlet for strained liquid in the pump section and that of excess liquid through the strainer element into the discharge outlet in the strainer section is also, for preference, assisted by forming the wall in the casing at the portions adjacent said outlets so that said portions diverge in the direction of said outlets.

Figure 6:
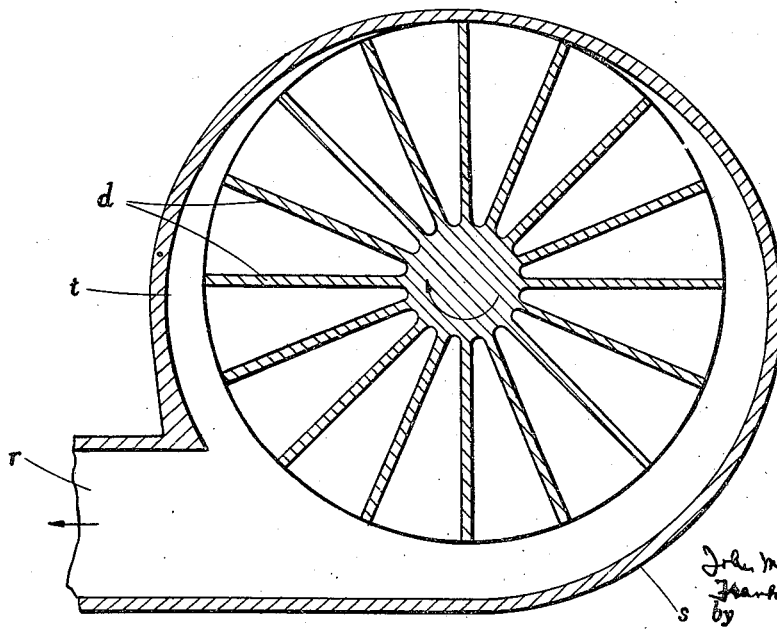
Fig. 6 is a transverse section on the line 5—5 in Fig. 5.

In the form illustrated in Fig. 1 where the two sections of the rotor are of equal diameter it is necessary that delivery shall be against no appreciable head so that it is advisable to use the same to deliver strained liquid to the suction side of a pump, but if desired the device may itself constitute a low pressure pump. For this purpose, as it will have to pump against an appreciable head, it is advisable to increase the diameter of the pump section of the rotor. Such a modification is illustrated in Figs. 5 and 6 of the drawings and as the details of such modified form of strainer are the same as those described in connection with Fig. 1 no further description of the same is necessary.

In operation the rotation of the rotor, which is preferably driven at speeds of from 500 R. P. M. up to 3,000 R. P. M. relatively to the converging section $q$ of the strainer section of the casing acts to induce an excess quantity of liquid to flow into the casing through the inlet opening, through the opposing section of the enclosing strainer element and so into each channel of the strainer section of the rotor as they pass the inlet opening. As the rotor rotates such liquid will be pumped along the channels, through the openings $g$ in the circular ring $c$ and so into the corresponding channels of the pump section. In this section the speed of rotation of the rotor in conjunction with the diverging portion $s$ of the wall of the casing serves to eject the major portion of the liquid out through the discharge outlet, either to the suction side of an associated pump or otherwise as previously described. As the action of the rotor in the strainer section induces in an excess quantity of liquid this excess liquid remains within the channels in the pump section as they pass beyond the discharge outlet, and is carried round with the rotor. As will be seen by reference to Fig. 3 the opposing wall of the casing is eccentric so that it gradually converges inwards towards the rotor from the upper or rear edge of the outlet opening. This eccentric or converging portion is indicated at $t$ in the figure. As a result of this convergence the excess liquid within the channels of the pump section of the rotor is placed under pressure with the result that the liquid is forced to flow in the reverse direction along the channels, back through the passages $g$ into the corresponding channels of the strainer section and so out through the enclosing section of the strainer element as each channel registers with the diverging portion of the wall approaching the discharge outlet leading into the coned passage $p$, thereby cleaning the strainer element opposite each channel in turn, the liquid finally being carried away, preferably to a sump for re-use.

A strainer according to the present invention is particularly suitable for use with high speed hydraulic pumps in which oil is the liquid medium but it is also capable of use for other purposes and other liquids.

What we claim is:

1. A self-cleaning strainer assembly for liquids comprising a casing, a power-driven rotor mounted to rotate within said casing, said casing and rotor each consisting of two cooperating units, forming respectively strainer and discharge sections, intercommunicating passages between the respective sections, an inlet for liquid to be strained in the first of said sections, and an outlet through which the strained liquid is discharged in the second of said sections, rotatable means for straining incoming liquid in the first of said sections, cooperating means in the first of said sections for pumping upon rotation of the rotor an excess of strained liquid into the second of said sections, for discharge of a substantial amount thereof through the outlet thereof, and cooperating means in the second section operable upon rotation of the rotor for redirecting under pressure the undischarged strained liquid pumped thereinto, back into the first section, through the straining means, in a direction of flow opposite to and along a path different from that of the incoming liquid to effect cleaning of said straining means.

2. A self-cleaning strainer assembly for liquids comprising a casing, a power-driven rotor mounted to rotate within said casing, said casing and rotor each consisting of two cooperating units, forming respectively strainer and discharge sections, intercommunicating passages between the respective sections, an inlet for liquid to be strained in the first of said sections, and an outlet through which the strained liquid is discharged in the second of said sections, rotatable means for straining incoming liquid in the first of said sections, cooperating means in the first of said sections for pumping upon rotation of the rotor an excess of strained liquid into the second of said sections, cooperating means in said second section operable upon rotation of the rotor for discharging a substantial portion of the strained liquid pumped thereinto through the outlet, and further cooperating means in the second section operable upon rotation of the rotor for redirecting under pressure the undischarged strained liquid pumped thereinto, back into the first section, through the straining means, in a direction of flow opposite to and along a path different from that of the incoming liquid to effect cleaning of said straining means.

3. A self-cleaning strainer assembly for liquids comprising a casing for liquids comprising a casing having an inlet for liquid to be strained and an outlet through which the strained liquid is discharged, a power-driven rotor mounted to rotate within and relative to said casing, means extending circumferentially around said rotor and serving to divide both the casing and rotor each into cooperating units forming a strainer section and a discharge sections, openings in said dividing means providing a communication between said sections, a rotatable element disposed within the strainer section for straining incoming liquid, means on both the rotor unit and corresponding unit of the casing in the strainer section cooperating upon rotation of the rotor to pump strained liquid in excess through the communicating openings of the dividing means into the discharge section for passage through the outlet, and further means on the discharge unit of the rotor and the corresponding unit of the casing cooperating upon rotation of the rotor to displace the excess of strained liquid being pumped therethrough to pass in the reverse direction under pressure back into the strainer section and through the strainer element in a direction reverse to and along a path different from that of the incoming liquid being strained, whereby to effect the cleaning of the strainer element.

4. A self-cleaning strainer assembly for liquids comprising a casing having an inlet for liquid to be strained and an outlet through which the strained liquid is discharged, a power-driven rotor mounted to rotate within and relative to said casing, a plurality of longitudinal channels arranged side by side around the circumference of the rotor, a cylindrical wall extending circumferentially around the rotor and serving to divide both the casing and the rotor transversely into two units, comprising respectively the strainer section and a discharge section, openings through the wall formed to provide communication between the respective channel portions on the opposite sides of the wall, a rotatable strainer element enclosing the channels on the rotor unit of the strainer section, a converging wall forming part of the casing unit opposite to and cooperating with the rotor unit in the strainer section, and adjacent the inlet for the liquid to be strained, for causing the liquid passing through the strainer element to be pumped in turn along the two connected portions of each rotor channel lying respectively in the strainer and discharge sections, as the rotor revolves, and a further converging wall forming part of the casing unit opposite to and cooperating with the channels of the rotor unit in the discharge section, for displacing undischarged strained liquid from the discharge section in reverse direction to that of the strained liquid, back into the channels of the rotor unit of the straining section along a path different from that of the strained liquid being pumped into the discharge section and through the strainer element therein, thereby to clean said strainer element.

5. A self-cleaning strainer assembly for liquids comprising a casing having an inlet for liquid to be strained and an outlet through which the strained liquid is discharged, a power-driven rotor mounted to rotate within and relative to the said casing, a plurality of longitudinal channels arranged side by side around the circumference of the rotor, a cylindrical wall extending circumferentially around the rotor and serving to divide both the casing and the rotor transversely into two units, comprising respectively the strainer section and a discharge section, openings through the wall formed to provide communication between the respective channel portions on the opposite sides of the wall, a rotatable strainer element enclosing the channels on the rotor unit of the strainer section, a converging wall forming part of the casing unit opposite to and cooperating with the rotor unit in the strainer section, and adjacent the inlet for the liquid to be strained, for causing the liquid passing through the strainer element to be pumped in turn along the two connected portions of each rotor channel lying respectively in the strainer and discharge sections, as the rotor revolves, and a further converging wall forming part of the casing unit opposite to and cooperating with the channels of the rotor unit in the discharge section, for displacing excess of the strained liquid being pumped into the discharge section in reverse direction to that of the strained liquid, back into the channels of the rotor unit of the straining section and through the strainer element therein, thereby to clean said strainer element, and additional converging wall formations of the casing unit in the strainer section cooperating with the channels of the rotor unit in said section for discharging the aforesaid excess strained fluid.

JOHN MAURICE TOWLER.
FRANK HATHORN TOWLER.